US012657906B2

(12) United States Patent
Long et al.

(10) Patent No.: US 12,657,906 B2
(45) Date of Patent: Jun. 16, 2026

(54) SURFACE WATER MONITORING METHOD AND APPARATUS, COMPUTER DEVICE, AND STORAGE MEDIUM

(71) Applicant: TSINGHUA UNIVERSITY, Beijing (CN)

(72) Inventors: Di Long, Beijing (CN); Luo-Qi Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 297 days.

(21) Appl. No.: 18/388,841

(22) Filed: Nov. 12, 2023

(65) Prior Publication Data

US 2024/0282102 A1 Aug. 22, 2024

(30) Foreign Application Priority Data

Feb. 21, 2023 (CN) .......................... 202310187504.8

(51) Int. Cl.
| | |
|---|---|
| *G06V 20/13* | (2022.01) |
| *G01C 13/00* | (2006.01) |

(Continued)

(52) U.S. Cl.
CPC ............. *G06V 20/13* (2022.01); *G01C 13/00* (2013.01); *G01S 13/9021* (2019.05); *G06V 10/22* (2022.01); *G06V 10/764* (2022.01)

(58) Field of Classification Search
CPC ...... G06V 20/13; G06V 10/22; G06V 10/764; G01S 13/9021
See application file for complete search history.

(56) References Cited

U.S. PATENT DOCUMENTS

| | | | | |
|---|---|---|---|---|
| 11,907,819 B2 * | 2/2024 | Shen | .......................... | G06F 16/29 |
| 2022/0156492 A1 * | 5/2022 | Basu | .......................... | G06T 5/50 |

(Continued)

FOREIGN PATENT DOCUMENTS

CN 111767801 A 10/2020

OTHER PUBLICATIONS

B. Pham-Duc and F. Frappart, "Monitoring Variation of Reservoir Water Volume Using SAR Sentinel-1 Observations and Jason-3 Radar Altimetry Data," IGARSS 2022—2022 IEEE International Geoscience and Remote Sensing Symposium, Kuala Lumpur, Malaysia, 2022, pp. 7988-7991 (Year: 2022).*

(Continued)

*Primary Examiner* — Marcus E Windrich

(57) ABSTRACT

What disclosed are a surface water monitoring method and apparatus, a computer device, and a storage medium. The method includes: obtaining optical satellite images and synthetic aperture radar satellite images of an area to be monitored in a preset time period; determining a first target region in each optical satellite image, determining a water body type of a pixel in a second target region in the SAR satellite image corresponding to the first target region; determining water body types of pixels in other regions in the optical satellite image, the other regions being regions in the optical satellite image other than the first target region; and determining surface water distribution information of the area to be monitored in the preset time period according to the water body type of the pixel in the second target region and the water body types of the pixels in the other regions.

15 Claims, 5 Drawing Sheets

(51) Int. Cl.
   *G01S 13/90* (2006.01)
   *G06V 10/22* (2022.01)
   *G06V 10/764* (2022.01)

(56) References Cited

U.S. PATENT DOCUMENTS

2022/0316876 A1 * 10/2022 Cheng ................. G01C 13/008
2025/0237785 A1 * 7/2025 Pandit ................... G06Q 50/02
2025/0328988 A1 * 10/2025 Selby ........................ G06T 5/50

OTHER PUBLICATIONS

Yan La et al., "A review on water resources stereoscopic monitoring systems based on multisource data", Journal of Remote Sensing, vol. 24, No. 7, Jul. 25, 2020, pp. 787-803.

Li Hui, "Remote sensing monitoring wetland water and the analysis of influencing factors in Shaanxi Province", China Master's Theses Full-text Database_ Engineering Science and Technology I, Jan. 15, 2023, pp. B027-B1884.

Christian Tottrup et al., "Surface Water Dynamics from Space: A Round Robin Intercomparison of Using Optical and SAR High-Resolution Satellite Observations for Regional Surface Water Detection", Remote Sensing, vol. 14, No. 10, May 17, 2022, pp. 1-21.

Lijuan Zhu et al., "Assessing degradation of lake wetlands in Bashang Plateau, China based on long-term time series Landsat images using wetland degradation index", Ecological Indicators, vol. 139, Apr. 29, 2022, pp. 1-14.

* cited by examiner

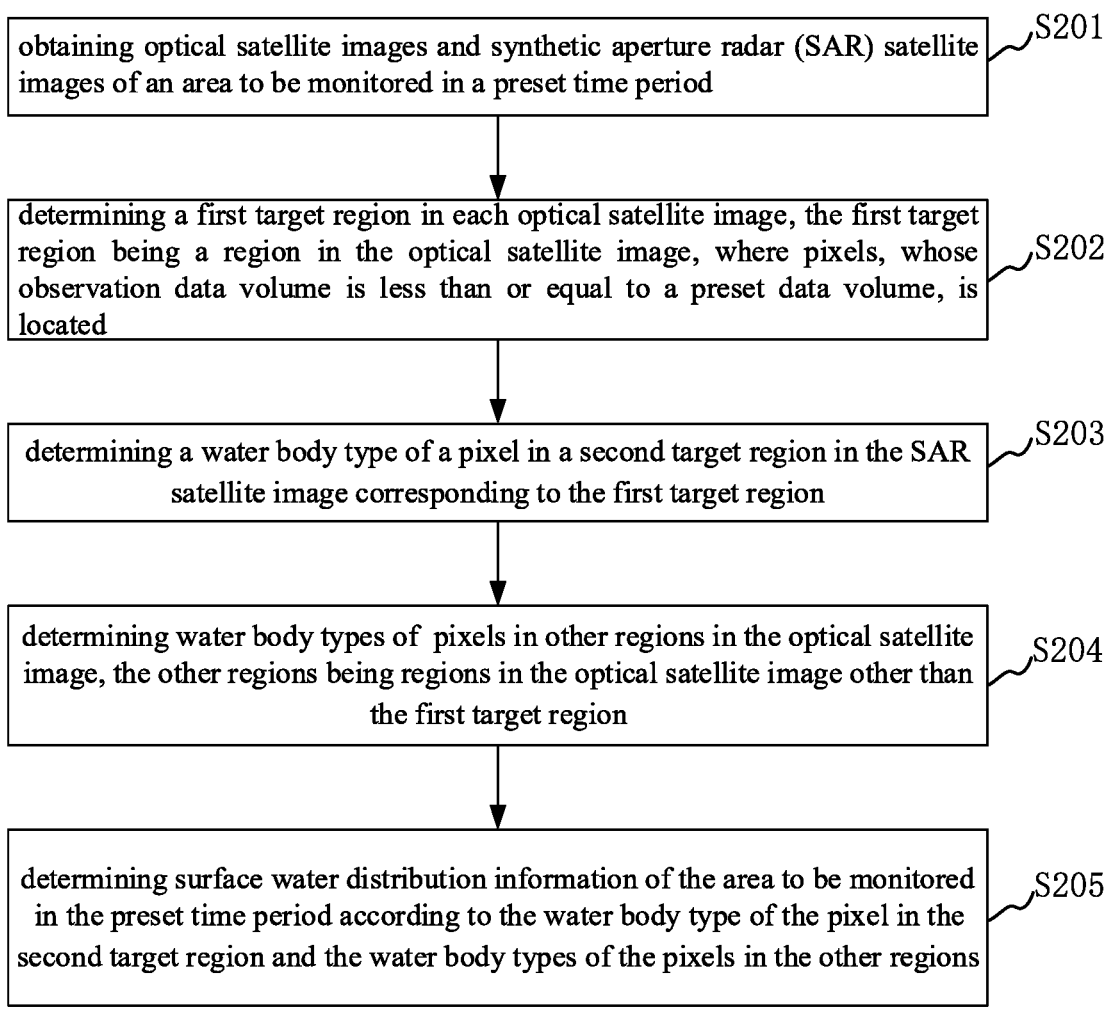

obtaining optical satellite images and synthetic aperture radar (SAR) satellite images of an area to be monitored in a preset time period ⟿S201 determining a first target region in each optical satellite image, the first target region being a region in the optical satellite image, where pixels, whose observation data volume is less than or equal to a preset data volume, is located ⟿S202 determining a water body type of a pixel in a second target region in the SAR satellite image corresponding to the first target region ⟿S203 determining water body types of pixels in other regions in the optical satellite image, the other regions being regions in the optical satellite image other than the first target region ⟿S204 determining surface water distribution information of the area to be monitored in the preset time period according to the water body type of the pixel in the second target region and the water body types of the pixels in the other regions ⟿S205

FIG. 2

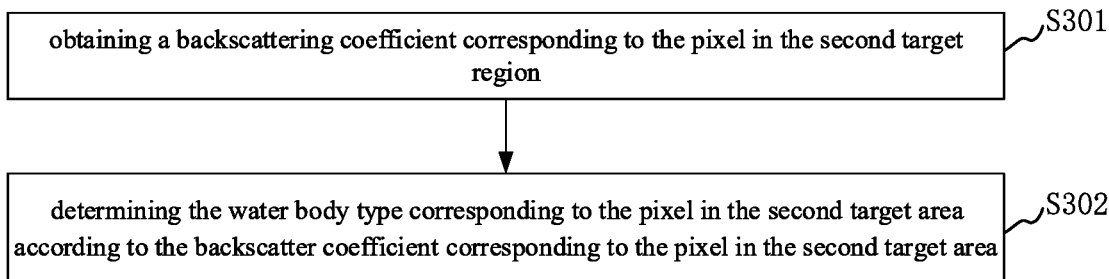

obtaining a backscattering coefficient corresponding to the pixel in the second target region ⟿S301 determining the water body type corresponding to the pixel in the second target area according to the backscatter coefficient corresponding to the pixel in the second target area ⟿S302

FIG. 3

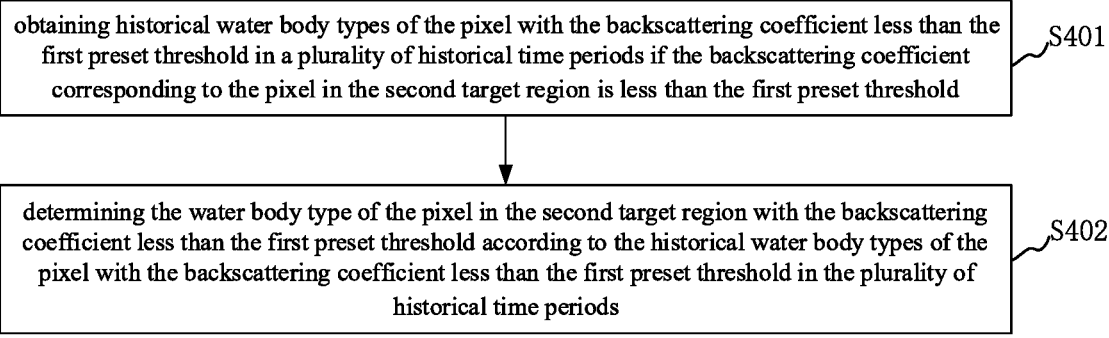

obtaining historical water body types of the pixel with the backscattering coefficient less than the first preset threshold in a plurality of historical time periods if the backscattering coefficient corresponding to the pixel in the second target region is less than the first preset threshold   S401 determining the water body type of the pixel in the second target region with the backscattering coefficient less than the first preset threshold according to the historical water body types of the pixel with the backscattering coefficient less than the first preset threshold in the plurality of historical time periods   S402

FIG. 4

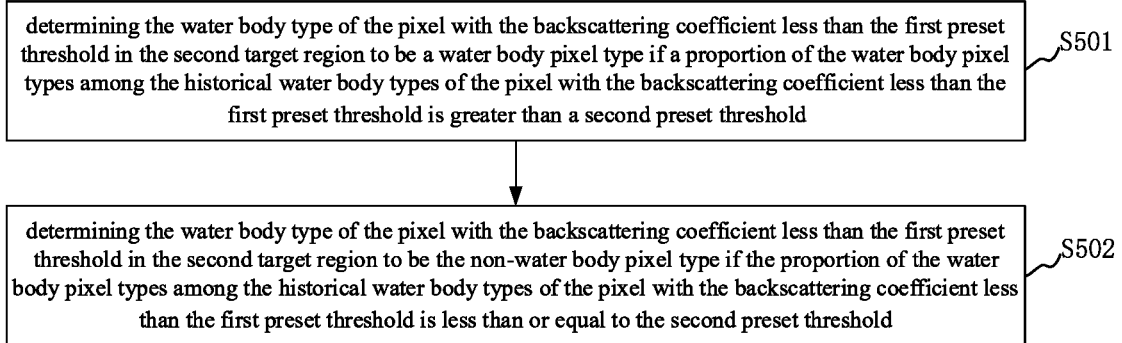

determining the water body type of the pixel with the backscattering coefficient less than the first preset threshold in the second target region to be a water body pixel type if a proportion of the water body pixel types among the historical water body types of the pixel with the backscattering coefficient less than the first preset threshold is greater than a second preset threshold   S501 determining the water body type of the pixel with the backscattering coefficient less than the first preset threshold in the second target region to be the non-water body pixel type if the proportion of the water body pixel types among the historical water body types of the pixel with the backscattering coefficient less than the first preset threshold is less than or equal to the second preset threshold   S502

FIG. 5

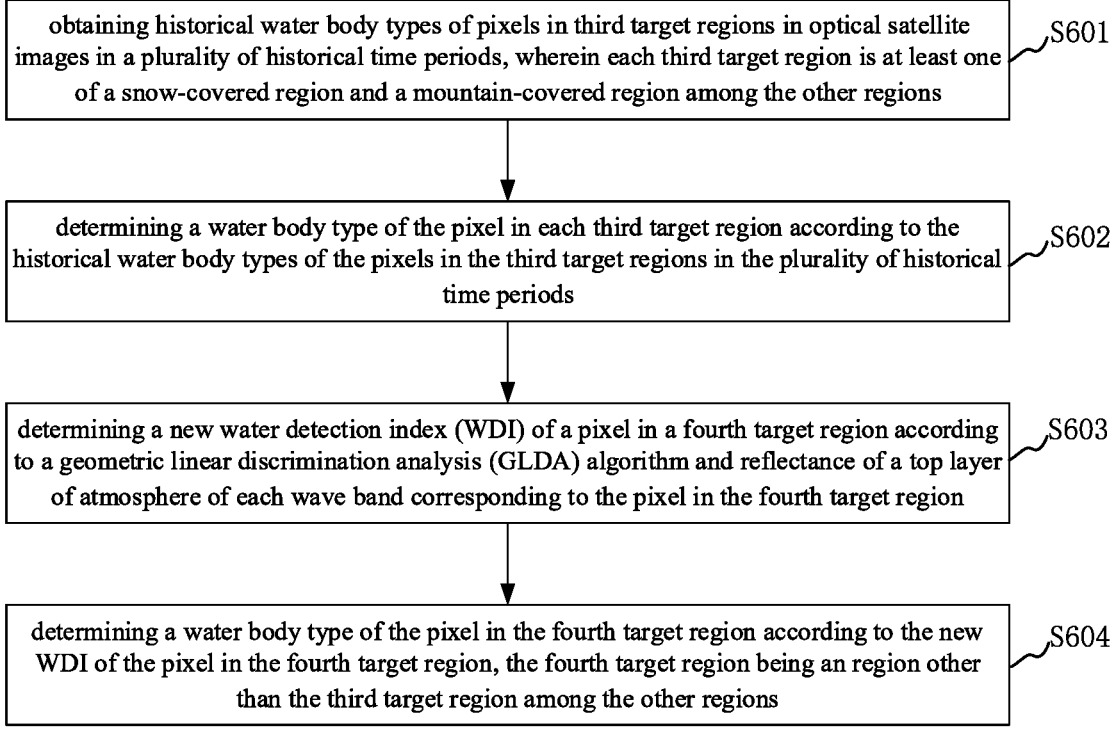

obtaining historical water body types of pixels in third target regions in optical satellite images in a plurality of historical time periods, wherein each third target region is at least one of a snow-covered region and a mountain-covered region among the other regions ⟋S601 determining a water body type of the pixel in each third target region according to the historical water body types of the pixels in the third target regions in the plurality of historical time periods ⟋S602 determining a new water detection index (WDI) of a pixel in a fourth target region according to a geometric linear discrimination analysis (GLDA) algorithm and reflectance of a top layer of atmosphere of each wave band corresponding to the pixel in the fourth target region ⟋S603 determining a water body type of the pixel in the fourth target region according to the new WDI of the pixel in the fourth target region, the fourth target region being an region other than the third target region among the other regions ⟋S604

FIG. 6

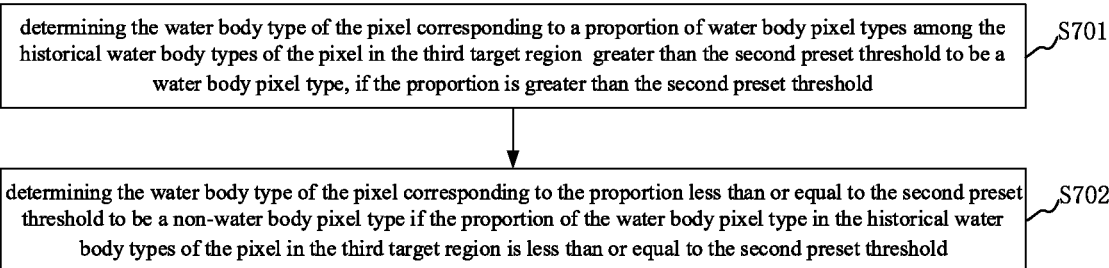

determining the water body type of the pixel corresponding to a proportion of water body pixel types among the historical water body types of the pixel in the third target region  greater than the second preset threshold to be a water body pixel type, if the proportion is greater than the second preset threshold ⟋S701 determining the water body type of the pixel corresponding to the proportion less than or equal to the second preset threshold to be a non-water body pixel type if the proportion of the water body pixel type in the historical water body types of the pixel in the third target region is less than or equal to the second preset threshold ⟋S702

FIG. 7

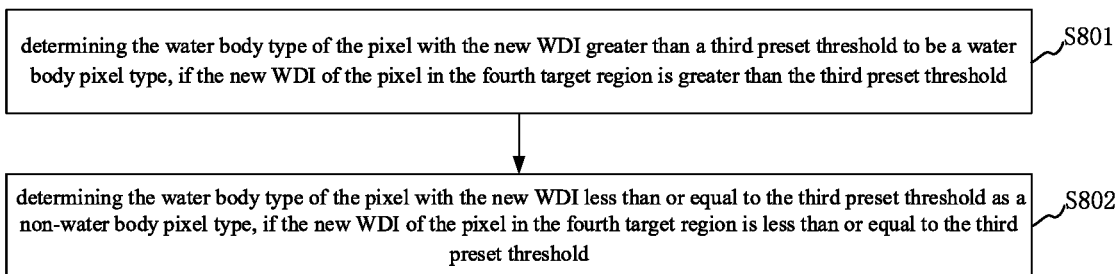

determining the water body type of the pixel with the new WDI greater than a third preset threshold to be a water body pixel type, if the new WDI of the pixel in the fourth target region is greater than the third preset threshold    S801 determining the water body type of the pixel with the new WDI less than or equal to the third preset threshold as a non-water body pixel type, if the new WDI of the pixel in the fourth target region is less than or equal to the third preset threshold    S802

FIG. 8

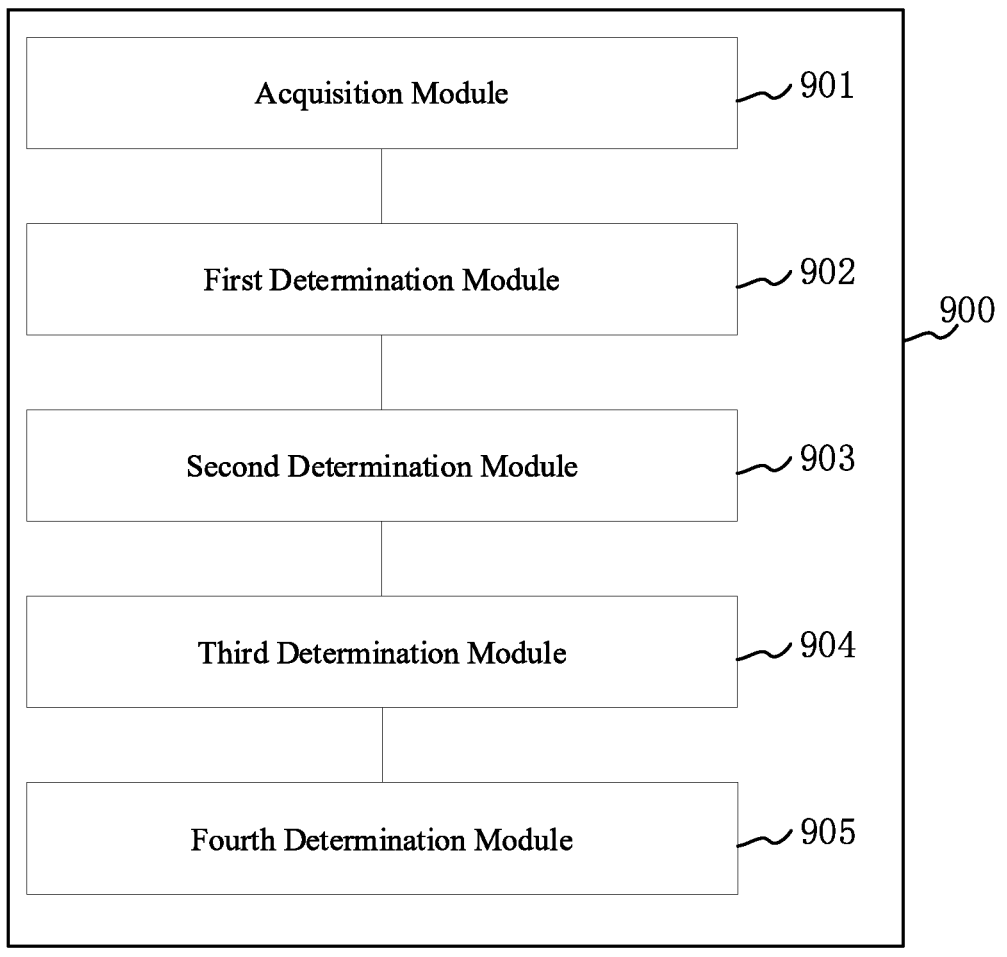

Acquisition Module    901

First Determination Module    902

Second Determination Module    903    900

Third Determination Module    904

Fourth Determination Module    905

FIG. 9

SURFACE WATER MONITORING METHOD AND APPARATUS, COMPUTER DEVICE, AND STORAGE MEDIUM

CROSS-REFERENCE TO RELATED APPLICATIONS

The present application claims priority to Chinese patent application No. 202310187504.8, filed on Feb. 21, 2023, the entire content of which is incorporated herein by reference.

TECHNICAL FIELD

The present application relates to the technical field of surface water monitoring, and in particular, to a surface water monitoring method, and a surface water monitoring apparatus, a computer device and a storage medium.

BACKGROUND

Surface water is one of the most sensitive forms of water bodies to climate change and human activities. Changes in the surface water trend will affect the total amount of water available to humans, and changes in the surface water seasonality will affect the location and time of water resources available to humans. Changes in the surface water are significantly affected by meteorological factors such as precipitation and temperature, as well as human activities such as coal mine excavation and overexploitation of ground water. Therefore, the monitoring of the surface water is particularly important.

In the related art, distribution information of the surface water is obtained by monitoring the surface water information in an area to be monitored by optical satellites. However, in the case of cloudy and rainy areas in the area to be monitored, penetration of electromagnetic waves in the visible light band and in the near-infrared band is poor, so it is difficult to for the electromagnetic waves to penetrate a cloud layer and be received by the optical satellites. Therefore, the accuracy of the distribution information of the surface water in the cloudy and rainy areas obtained by using the optical satellites is low.

SUMMARY

Based on this, to address the above technical problems, it is necessary to provide a surface water monitoring method and a surface water monitoring apparatus, a computer device, and a storage medium that can improve the accuracy of monitoring of surface water information in an area to be monitored.

In a first aspect, the present application provides a surface water monitoring method. The method includes following steps.

Optical satellite images and synthetic aperture radar (SAR) satellite images of an area to be monitored are obtained in a preset time period.

A first target region in each optical satellite image is determined. The first target region is a region in the optical satellite image, where pixels, whose observation data volume is less than or equal to a preset data volume, is located.

A water body type of a pixel in a second target region in the SAR satellite image corresponding to the first target region is determined.

Water body types of pixels in other regions in the optical satellite image are determined. The other regions are regions in the optical satellite image other than the first target region.

Surface water distribution information of the area to be monitored in the preset time period is determined according to the water body type of the pixel in the second target region and the water body types of the pixels in the other regions.

In an embodiment, the determining the water body type of the pixel in the second target region in the SAR satellite image corresponding to the first target region includes following steps.

A backscatter coefficient corresponding to the pixel in the second target region is obtained.

The water body type of the pixel in the second target region determined according to the backscatter coefficient corresponding to the pixel in the second target region.

In an embodiment, the determining the water body type of the pixel in the second target region according to the backscatter coefficient corresponding to the pixel in the second target region includes following steps.

If the backscatter coefficient corresponding to the pixel in the second target region is greater than or equal to a first preset threshold, the water body type of the pixel with the backscatter coefficient greater than or equal to the first preset threshold is determined to be a non-water body pixel type.

In an embodiment, the method further includes following steps.

If the backscatter coefficient corresponding to the pixel in the second target region is less than the first preset threshold, historical water body types of the pixel with the backscatter coefficient less than the first preset threshold in a plurality of historical time periods are obtained.

The water body type of the pixel in the second target region with the backscatter coefficient less than the first preset threshold is determined according to the historical water body types of the pixel with the backscatter coefficient less than the first preset threshold in the plurality of historical time periods.

In an embodiment, the determining the water body type of the pixel in the second target region with the backscatter coefficient less than the first preset threshold according to the historical water body types of the pixel with the backscatter coefficient less than the first preset threshold in the plurality of historical time periods includes following steps.

If a proportion of the water body pixel types among the historical water body types of the pixel with the backscatter coefficient less than the first preset threshold is greater than a second preset threshold, the water body type of the pixel with the backscatter coefficient less than the first preset threshold in the second target region is determined to be a water body pixel type.

If the proportion of the water body pixel types among the historical water body types of the pixel with the backscatter coefficient less than the first preset threshold is less than or equal to the second preset threshold, the water body type of the pixel with the backscatter coefficient less than the first preset threshold in the second target region is determined to be the non-water body pixel type.

In an embodiment, the determining the water body types of the pixels in the other regions in the optical satellite image includes following steps.

Historical water body types of pixels in third target regions in optical satellite images in a plurality of historical time periods are obtained. Each third target region is a snow-covered region and/or a mountain-covered region among the other regions.

A water body type of the pixel in each third target region is determined according to the historical water body types of the pixels in the third target regions in the plurality of historical time periods.

A new water detection index (WDI) of a pixel in a fourth target region is determined according to a geometric linear discrimination analysis (GLDA) algorithm and reflectance of a top layer of atmosphere of each wave band corresponding to the pixel in the fourth target region.

A water body type of the pixel in the fourth target region is determined according to the new WDI of the pixel in the fourth target region. The fourth target region is an region other than the third target region among the other regions.

In an embodiment, the determining the water body type of the pixel in each third target region according to the historical water body types of the pixels in the third target regions in the plurality of historical time periods includes following steps.

If a proportion of the water body pixel type in the historical water body types of the pixel in the third target region is greater than a second preset threshold, the water body type of the pixel corresponding to the proportion greater than the second preset threshold is determined to be a water body pixel type.

If the proportion of the water body pixel type in the historical water body types of the pixel in the third target region is less than or equal to the second preset threshold, the water body type of the pixel corresponding to the proportion less than or equal to the second preset threshold is determined to be a non-water body pixel type.

In an embodiment, the determining the water body type of the pixel in the fourth target region according to the new WDI of the pixel in the fourth target region includes following steps. If the new WDI of the pixel in the fourth target region is greater than a third preset threshold, the water body type of the pixel with the new WDI greater than the third preset threshold is determined to be a water body pixel type.

If the new WDI of the pixel in the fourth target region is less than or equal to the third preset threshold, the water body type of the pixel with the new WDI less than or equal to the third preset threshold is determined as a non-water body pixel type.

In a second aspect, the present application further provides a surface water monitoring apparatus. The apparatus includes an acquisition module, a first determination module, a second determination module, a third determination module, and a fourth determination module.

The acquisition module is configured to obtain optical satellite images and SAR satellite images of an area to be monitored in a preset time period.

The first determination module is configured to determine a first target region in each optical satellite image, the first target region being a region in the optical satellite image, where pixels, whose observation data volume is less than or equal to a preset data volume, is located.

The second determination module is configured to determine a water body type of a pixel in a second target region in the SAR satellite image corresponding to the first target region.

The third determination module is configured to determine water body types of pixels in other regions in the optical satellite image, the other regions being regions in the optical satellite image other than the first target region.

The fourth determination module is configured to determine surface water distribution information of the area to be monitored in the preset time period according to the water body type of the pixel in the second target region and the water body type of the pixel in the other region.

In a third aspect, the present application further provides a computer device. The computer device includes a processor and a memory having computer programs stored thereon, wherein the processor, when executing the programs, implements steps of the method described above.

In a fourth aspect, the present application further provides non-transitory computer-readable storage medium having computer programs stored thereon, wherein the computer programs, when executed by the processor, force the processor to implement steps of the method described above.

In a fifth aspect, the present application further provides a computer program product is provided, and includes computer programs. The computer programs, when executed by a processor, implement steps of any method described above.

In the surface water monitoring method and apparatus, the computer device and the storage medium described above, the first target region in the optical satellite image is determined by obtaining the optical satellite images and the SAR satellite images of the area to be monitored in the preset time period. Further, the water body type of a pixel in the second target region in the SAR satellite image corresponding to the first target region is determined, and the water body types of pixels in other regions in the optical satellite image are determined. Finally, the surface water distribution information of the area to be monitored in the preset time period is determined according to the water body type of the pixel in the second target region and the water body types of the pixels in the other regions. In the related art, distribution information of the surface water is obtained by monitoring the surface water information in an area to be monitored by optical satellites. However, in the case of cloudy and rainy areas in the area to be monitored, penetration of electromagnetic waves in the visible light band and in the near-infrared band is poor, so it is difficult to for the electromagnetic waves to penetrate a cloud layer and be received by the optical satellites. Therefore, the accuracy of the distribution information of the surface water in the cloudy and rainy areas obtained by using the optical satellites is low. In the present application, the information of the surface water in the area to be monitored is monitored by combining the optical satellite images and the SAR satellite images. Because a microwave wave band received by the SAR satellite has a strong penetrating capability, and the microwave wave band can pass through the cloud layer and be received by the SAR satellite. Therefore, the monitoring of the surface water in cloudy and rainy areas can be realized by using the SAR satellite. In addition, the information of the surface water of the area to be monitored is monitored by combining the optical satellite images and the SAR satellite images, thereby improving the accuracy of monitoring the surface water information of the area to be monitored.

BRIEF DESCRIPTION OF THE DRAWINGS

FIG. 2 is a flow chart showing a surface water monitoring method according to an embodiment of the present application.

FIG. 3 is a flow chart showing a method for determining a water body type corresponding to a pixel in a second target region according to an embodiment of the present application.

FIG. 4 is a flow chart showing the method for determining the water body type corresponding to a pixel in the second target region according to another embodiment of the present application.

FIG. 5 is a flow chart showing the method for determining the water body type corresponding to a pixel in the second target region according to yet another embodiment of the present application.

FIG. 6 is a flow chart showing the method for determining the water body type corresponding to a pixel in other regions according to an embodiment of the present application.

FIG. 7 is a flow chart showing the method for determining the water body type corresponding to a pixel in a third target region according to an embodiment of the present application.

FIG. 8 is a flow chart showing the method for determining the water body type corresponding to a pixel in a fourth target region according to an embodiment of the present application.

FIG. 9 is a block diagram showing a configuration of a surface water monitoring apparatus according to an embodiment of the present application.

DETAILED DESCRIPTION OF THE EMBODIMENTS

Figure 1:
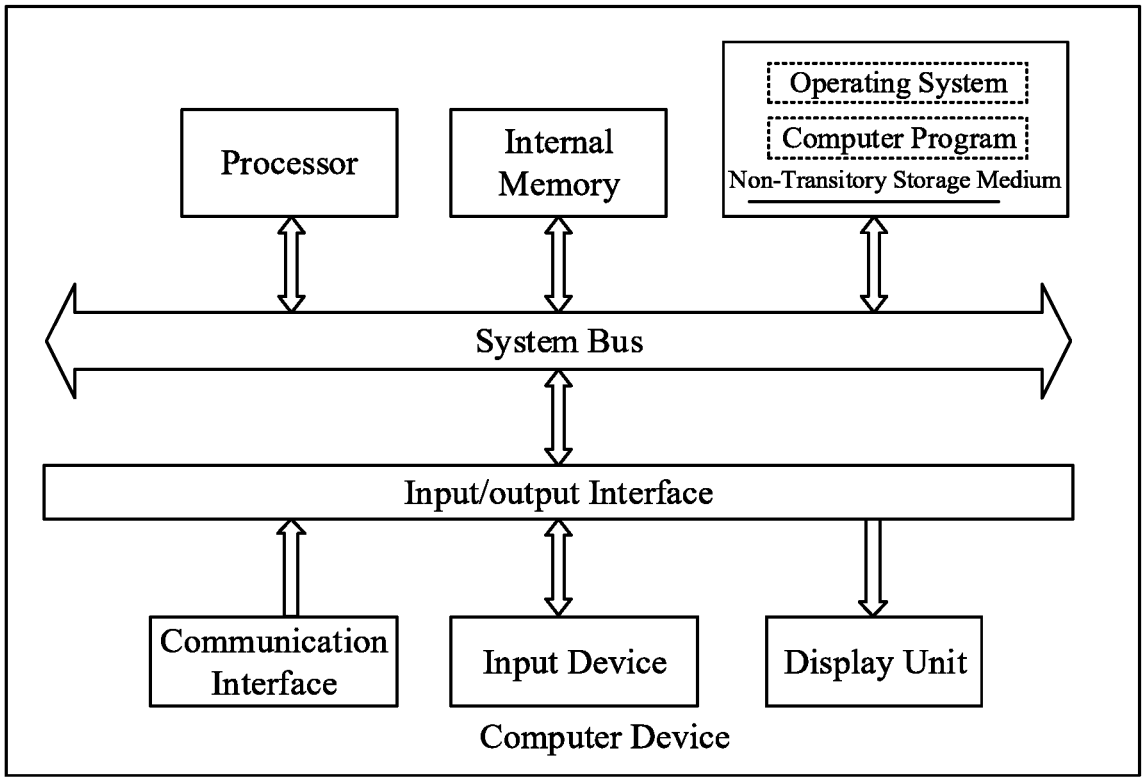
FIG. 1 is a diagram showing an internal configuration of a computer device according to an embodiment of the present application.

In order to make the objectives, technical solutions and advantages of the present application more clearly and to be better understood, the application will be further described in details combining with the accompanying drawings and embodiments. It should be understood that the specific embodiments described herein are only used to explain the application but not to limit the application.

The embodiments provided by the present application may be applied to a computer device as shown in FIG. 1. Referring to FIG. 1, FIG. 1 is a diagram showing an internal configuration of the computer device according to an embodiment of the present application. The computer device may be a terminal. The computer device includes a processor, a memory, a communication interface, a display screen, and an input device, which are connected through a system bus. The processor of the computer device is configured to provide computing and control capabilities. The memory of the computer device includes a non-transitory storage medium and an internal memory. The non-transitory storage medium stores an operating system and computer programs. The internal memory provides an environment for the operation of the operating systems and the computer programs in the non-transitory storage medium. The communication interface of the computer device is configured to communicate with external terminals in a wired or wireless mode, and the wireless communication can be realized by WIFI, mobile cellular network, near field communication (NFC), or other technologies. The computer programs, when being executed by the processor, implement the surface water monitoring method. The display screen of the computer device may be an LCD or e-ink display, and the input device of the computer device may be a touch layer covering the display screen, or a key, trackball or trackpad arranged on the housing of the computer device, or an external keyboard, trackpad or mouse, etc.

It should be understood by those skilled in the art that the configuration illustrated in FIG. 1, which is only a block diagram of part of the configuration related to the solution of the present application, does not constitute a limitation on the computer device to which the solution of the present application is applied. The specific computer device may include more or fewer components than those shown in the figure, or may combine some components, or may have a different arrangement of components.

In an embodiment, as shown in FIG. 2, FIG. 2 is a flow chart showing a surface water monitoring method according to an embodiment of the present application. Taking the method applied to the computer device in FIG. 1 as an example for illustration, the method includes the following steps S201 to S205.

In step S201, optical satellite images and synthetic aperture radar (SAR) satellite images of an area to be monitored in a preset time period are obtained.

An optical satellite is a satellite that detects sunlight for imaging, and an SAR satellite is a satellite that achieves high-resolution microwave imaging based on the principle of synthetic aperture. The preset time period may be a current time period including the current time, or the preset time period may be a time period before the current time. The preset time period may be a month, a quarter, and so on.

In the present embodiment, for example, the preset time period is the time period before the current time. If the current time is Nov. 1, 2022, the preset time period may be October 2022. Images of a Landsat-8 satellite and images of a Sentinel-2 satellite in the area to be monitored in October 2022 are selected as the optical satellite images, and images of a Sentinel-1 satellite are selected as the SAR satellite images.

Obtaining the optical satellite images and the SAR satellite images of the area to be monitored in the preset time period may be achieved in the following two manners.

First manner: firstly, a map vector file of the area to be monitored is imported into a google earth engine (GEE), which stores optical satellite images and SAR satellite images of the area to be monitored. The Landsat-8 satellite images, the Sentinel-2 satellite images and the Sentinel-1 satellite images of the area to be monitored in the preset time period are obtained. Then the obtained Landsat-8 satellite images, the Sentinel-2 satellite images and the Sentinel-1 satellite images are used as the optical satellite images and the SAR satellite images of the area to be monitored in the preset time period.

Second manner: optionally, cloud removal is performed on the obtained Landsat-8 satellite images and the Sentinel-2 satellite images, i.e., observation data of cloudy and rainy areas in the optical satellite images may be removed. Specifically, the cloud removal is performed on the Landsat-8 satellite images by using a QA_PIXEL wave band included in a Landsat-8 satellite image file, and the cloud removal is performed on the Sentinel-2 satellite images by using a Sentinel-2 cloud probability dataset provided by the GEE. Then the images obtained by performing the cloud removal on the Landsat-8 satellite images and on the Sentinel-2 satellite images of the area to be monitored in the preset time period is used as the optical satellite images of the area to be monitored in the preset time period, and the Sentinel-1 satellite images are used as the SAR satellite images of the area to be monitored in the preset time period.

In step S202, a first target region in each optical satellite image is determined. The first target region is a region in the optical satellite image, where pixels, whose observation data volume is less than or equal to a preset data volume, is located.

Exemplarily, if the optical satellite images of the area to be monitored in the preset time period are obtained through the first manner above, then the region in the optical satellite image, where the pixels whose observation data volume is less than or equal to the preset data volume is located, is used as the first target region.

Optionally, if the optical satellite images of the area to be monitored in the preset time period are obtained through the second manner above, the region in the optical satellite image corresponding to the pixels, on which the cloud removal is performed, is used as the first target region. The data volume of the observation data corresponding to the pixels, on which the cloud removal is performed, region is 0, and the data volume of the observation data corresponding to the pixels, on which the cloud removal is performed, region is less than or equal to the preset data volume.

In step S203, a water body type of a pixel in a second target region in the SAR satellite image corresponding to the first target region is determined.

The position of each pixel in the SAR satellite image corresponds to the position of each pixel in the optical satellite image. The water body types of pixels may be divided into a water body pixel type and a non-water body pixel type. A pixel belonging to the water body pixel type indicates that there is surface water in the region corresponding to the pixel, and a pixel belonging to the non-water body pixel type indicates that there is no surface water in the region corresponding to the pixel.

Because the data volume of the observation data of the first target region in the optical satellite image is relatively small, surface water distribution information of the first target region cannot be directly monitored by using the optical satellite image. In this case, the surface water distribution information of the first target region needs to be determined according to the SAR satellite image and historical water body types corresponding to a plurality of historical time periods of the first target region. Exemplarily, after the first target region is determined, the water body types of the pixels in the second target region corresponding to the first target region are determined according to the observation data in the SAR satellite.

In step S204, water body types of pixels in other regions in the optical satellite image are determined. The other regions are regions in the optical satellite image other than the first target region.

In the present embodiment, the water body types corresponding to the pixels in the other regions in the optical satellite image may be determined according to reflectance of a top layer of atmosphere of each wave band corresponding to the pixels in the other regions. The water body types corresponding to the pixels in the other regions in the optical satellite image may also be determined according to a product obtained by multiplying the reflectance of the top layer of the atmosphere of each wave band corresponding to the pixels in other regions by a first preset coefficient.

In step S205, surface water distribution information of the area to be monitored in the preset time period is determined according to the water body type of the pixel in the second target region and the water body types of the pixels in the other regions.

The area to be monitored are divided into the other regions and the first target region. Because the first target region corresponds to the second target region, the water body type of the pixel in the second target region is the same as the water body type of the first target region, and the surface water distribution information of the area to be monitored in the preset time period is determined according to the water body type of the pixel in the second target region and the water body types of the pixels in the other regions.

In the above surface water monitoring method, the first target region in the optical satellite image is determined by obtaining the optical satellite images and the SAR satellite images of the area to be monitored in the preset time period. Further, the water body type of the pixel in the second target region in the SAR satellite image corresponding to the first target region is determined, and the water body types of the pixels in the other regions in the optical satellite image are determined. Finally, the surface water distribution information of the area to be monitored in the preset time period is determined according to the water body type of the pixel in the second target region and the water body types of the pixels in the other regions. In the related art, distribution information of the surface water is obtained by monitoring the surface water information in an area to be monitored by optical satellites. However, in the case of cloudy and rainy areas in the area to be monitored, penetration of electromagnetic waves in the visible light band and in the near-infrared band is poor, so it is difficult to for the electromagnetic waves to penetrate a cloud layer and be received by the optical satellites. Therefore, the accuracy of the distribution information of the surface water in the cloudy and rainy areas obtained by using the optical satellites is low. In the present application, the information of the surface water in the area to be monitored is monitored by combining the optical satellite images and the SAR satellite images. Because a microwave wave band received by the SAR satellite has a strong penetrating capability, and the microwave wave band can pass through the cloud layer and be received by the SAR satellite. Therefore, the monitoring of the surface water in cloudy and rainy areas can be realized by using the SAR satellite. In addition, the information of the surface water of the area to be monitored is monitored by combining the optical satellite images and the SAR satellite images, thereby improving the accuracy of monitoring the surface water information of the area to be monitored.

FIG. 3 is a flow chart showing a method for determining the water body type of the pixel in the second target region according to an embodiment of the present application. The present embodiment relates to an implementation of how to determine the water body type of the pixel in the second target region in the SAR satellite image corresponding to the first target region. According to the above-mentioned embodiment, as shown in FIG. 3, the step S203 includes steps S301 and S302.

In step S301, a backscatter coefficient corresponding to the pixel in the second target region is obtained.

Exemplarily, the backscatter coefficient corresponding to the pixel in the Sentinel-1 satellite may be obtained directly. Or a vertical-vertical (VV) polarization is performed on an image of the backscatter coefficient corresponding to each pixel in the second target region in the VV polarized image of the Sentinel-1 satellite may be extracted.

In step S302, the water body type of the pixel in the second target region is determined according to the backscatter coefficient corresponding to the pixel in the second target region.

The present disclosure is described by combining with the above example. After the backscatter coefficient corresponding to the pixel in the second target region is determined, a first preset threshold is determined according to an expectation maximization (EM) algorithm and the backscatter coefficient corresponding to the pixel in the second target region. Specifically, it is assumed that the backscatter coefficient corresponding to the pixel in the second target region follows a generalized Gaussian distribution and a generalized Gaussian mixture distribution. The generalized Gaussian distribution is denoted as formula (1), and the generalized Gaussian mixture distribution is denoted as formula (2):

$$p_k(x|\theta_k) = \frac{\beta_k}{2\alpha_k \Gamma(1/\beta_k)} e^{-\left(\frac{|x-\mu_k|}{\alpha_k}\right)^{\beta_k}} \quad (k=0, 1) \tag{1}$$

-continued $$p(x) = \sum_{k=0}^{1} P_k p_k(x|\theta_k) \cdot (k = (0, 1)) \qquad (2)$$

where, x denotes the backscatter coefficient corresponding to each pixel in the second target region and is a scalar. k denotes the water body type of the pixel, k=0 denotes the non-water body pixel type, k=1 denotes the water body pixel type. $P_k(x|\theta_k)$ denotes a conditional probability of the backscatter coefficient x of the observed pixel when the pixel belongs to the k-th class. $\theta_k=[\alpha_k, \beta_k, \mu_k]$ is a parameter of the generalized Gaussian distribution, $\Gamma(\cdot)$ is a gamma function, and p(x) is the probability of the backscatter coefficient x of each pixel in the second target region. P(k) denotes a proportion of the k-th-type pixel in all pixels in the second target region, i.e., a probability that a pixel randomly selected from the second target region belongs to the k-th-type.

Since the models established by formula (1) and formula (2) are relatively complex, it is difficult to directly obtain an analytical solution of a maximum likelihood estimation, so it is necessary to use a numerical optimization E-M algorithm to solve formula (1) and formula (2). First, a distribution function of the water body pixel type and a distribution function of the non-water body pixel type are obtained by solving formula (1) and formula (2) according to the E-M algorithm, then the first preset threshold is obtained according to the distribution function of the water body pixel type and the distribution function of the non-water body pixel type, and finally the backscatter coefficient corresponding to the pixel in the second target region is compared with the first preset threshold to determine the water body type of the pixel in the second target region.

In the present embodiment, if only one SAR satellite image of the area to be monitored is obtained in the preset time period, the backscatter coefficient of the pixel in the image is directly obtained. If a plurality of SAR satellite images of the area to be monitored are obtained in the preset time period, a median of backscatter coefficients of pixels in the multiple SAR satellite images is used as the backscatter coefficient of the pixel in the SAR satellite image of the area to be monitored.

In some embodiments, if a plurality of SAR satellite images of the area to be monitored are obtained in the preset time period, an average of the backscatter coefficients of the pixels in the multiple SAR satellite images is used as the backscatter coefficient of the pixel in the SAR satellite image of the area to be monitored, and the present embodiment is not limited thereto.

In the embodiment of the present application, by determining the backscatter coefficient corresponding to the pixel in the second target region, the water body type of the pixel in the second target region is determined according to the backscatter coefficient corresponding to the pixel in the second target region, thereby realizing the monitoring of the information of the surface water in the cloudy and rainy areas, and improving the accuracy of the monitoring of the information of the surface water of the area to be monitored.

In an embodiment, the step S302 of determining the water body type of the pixel in the second target region according to the backscatter coefficient corresponding to the pixel in the second target region may include the following steps.

If the backscatter coefficient corresponding to the pixel in the second target region is greater than or equal to the first preset threshold, the water body type of the pixel with the backscatter coefficient greater than or equal to the first preset threshold is determined to be the non-water body pixel type.

The present disclosure is described by combining with the above example. The backscatter coefficient corresponding to the pixel of the non-water body type is greater than the backscatter coefficient corresponding to the water body pixel type. After the first preset threshold is determined, the backscatter coefficient corresponding to the pixel in the second target region is compared with the first preset threshold. If the backscatter coefficient corresponding to the pixel in the second target region is greater than or equal to the first preset threshold, the water body type of the pixel with the backscatter coefficient greater than or equal to the first preset threshold is determined to be the non-water body pixel type. For example, if the backscatter coefficient corresponding to a pixel 1 in the second target region is 0.07, and the first preset threshold is 0.05, then the water body type of the pixel 1 is determined to be the non-water body pixel type.

In the embodiment of the present application, if the backscatter coefficient corresponding to the pixel in the second target region is greater than or equal to the first preset threshold, the water body type of the pixel with the backscatter coefficient greater than or equal to the first preset threshold is determined to be the non-water body pixel type, thereby realizing the monitoring of the information of the surface water in the cloudy and rainy areas, and improving the accuracy of the monitoring of the information of the surface water of the area to be monitored.

FIG. 4 is a flow chart showing a method for determining the water body type of the pixel in the second target region according to another embodiment of the present application. The present embodiment relates to an implementation of how to determine the water body type of the pixel in the second target region according to the backscatter coefficient corresponding to the pixel in the second target region. On the basis of the above embodiments, as shown in FIG. 4, the step S302 further includes steps S401 and S402.

In step S401, if the backscatter coefficient corresponding to the pixel in the second target region is less than the first preset threshold, historical water body types of the pixel with the backscatter coefficient less than the first preset threshold in a plurality of historical time periods are obtained.

Specifically, the following formula (3) and formula (4) may be used to denote a determination process of the water body type for each pixel in the second target region in the SAR satellite:

$$Wat_{SI}^i = I\{VV_i < \text{Threshold}_{VV}\} \qquad (3)$$

$$Wat_{SI}^i = \begin{cases} 1, & \text{if the water body type of a pixel} \\ & \quad i \text{ is the water body pixel type} \\ 0, & \text{if the water body type of a pixel} \\ & \quad i \text{ is the non–water body pixel type} \end{cases} \qquad (4)$$

where $$Wat_{SI}^i$$

represents a classification result of the water body type of a pixel i in the second target region in the Sentinel-1 satellite image, $VV_i$ represents the backscatter coefficient of the pixel i, and $\text{Threshold}_{vv}$ represents the first preset threshold.

If the backscatter coefficient $VV_i$ corresponding to the pixel i in the second target region is less than the first preset threshold $Threshold_{vv}$, the historical water body types of the pixel i with the backscatter coefficient $VV_i$ less than the first preset threshold $Threshold_{vv}$ in the plurality of historical time periods are obtained. A duration of one historical time period is the same as a duration of the preset time period. For example, if the preset time period is November 2022, then the one historical time period is one month. Taking the plurality of historical time periods including March to October 2022 as an example, eight historical time periods are included in total.

In some embodiments, the historical water body types of the pixel with the backscatter coefficient less than the first preset threshold in the plurality of historical time periods may be calculated according to observation data corresponding to each pixel in the optical satellite images in the plurality of historical time periods.

In step S402, the water body type of the pixel in the second target region with the backscatter coefficient less than the first preset threshold is determined according to the historical water body types of the pixel with the backscatter coefficient less than the first preset threshold in the plurality of historical time periods.

Specifically, the first preset threshold is a first preset number. If the number of water body pixel type among the historical water body types of the pixel with the backscatter coefficient less than the first preset threshold is greater than a first preset number, the water body type of the pixel with the backscatter coefficient less than the first preset threshold in the second target region is determined to be the water body pixel type. If the number of water body pixel type among the historical water body types of the pixel with the backscatter coefficient less than the first preset threshold is less than or equal to the first preset number, the water body type of the pixel with the backscatter coefficient less than the first preset threshold in the second target region is determined to be the non-water body pixel type.

For example, the first preset number may be 6. If the pixel i is determined to be the water body pixel type for seven times, and determined to be the non-water body pixel type once during March to October 2022, then the water body type of the pixel i is determined to be the water body pixel type. If the pixel i is determined to be the water body pixel type for four times, and is determined to be the non-water body pixel type for four times during March to October 2022, then the water body type of the pixel i is determined to be the non-water body pixel type, because the number of times the pixel i is determined to be the water body pixel type during March to October is less than the first preset number 6.

In the embodiment of the present application, if the backscatter coefficient corresponding to the pixel in the second target region is less than the first preset threshold, then the historical water body types of the pixel with the backscatter coefficient less than the first preset threshold are obtained. Further, the water body type of the pixel with the backscatter coefficient less than the first preset threshold in the second target region is determined according to the historical water body types of the pixel with the backscatter coefficient less than the first preset threshold, thereby realizing the determination of the water body type of the pixel in the second target region.

FIG. 5 is a flow chart showing the method for determining the water body type corresponding to a pixel in the second target region according to yet another embodiment of the present application. The present embodiment relates to a possible implementation of how to determine the water body type of the pixel with the backscatter coefficient less than the first preset threshold in the second target region according to the historical water types corresponding to the pixel with the backscatter coefficient less than the first preset threshold in the plurality of historical time periods. On the basis of the embodiments above, as shown in FIG. 5, the step S402 includes steps S501 and S502.

In step S501, if a proportion of the water body pixel types among the historical water body types of the pixel with the backscatter coefficient less than the first preset threshold is greater than a second preset threshold, the water body type of the pixel with the backscatter coefficient less than the first preset threshold in the second target region is determined to be the water body pixel type.

In step S502, if the proportion of the water body pixel types among the historical water body types of the pixel with the backscatter coefficient less than the first preset threshold is less than or equal to the second preset threshold, the water body type of the pixel with the backscatter coefficient less than the first preset threshold in the second target region is determined to be the non-water body pixel type.

The present disclosure is described by combining with the above example. The second preset threshold is set to 50%. If the pixel i is determined to be the water body pixel type for seven times, and determined to be the non-water body pixel type once during March to October 2022, the proportion of the water body pixel types among the historical water body types of the pixel with the backscatter coefficient less than the first preset threshold is 87.5%, which is greater than the second preset threshold, i.e., 50%, then the water body type of the pixel i is determined to be the water body pixel type. If the pixel i is determined to be the water body pixel type for three times and determined to be the non-water body pixel type for five times during March to October 2022, the proportion of the water body pixel types among the historical water body types of the pixel i during March to October is 37.5%, which is less than the second preset threshold, i.e., 50%, then the water body type of pixel i is determined to be the non-water body pixel type.

In the embodiment of the present application, if the proportion of the water body pixel types among the historical water body types of the pixel with the backscatter coefficient less than the first preset threshold is greater than the second preset threshold, then the water body type of the pixel with the backscatter coefficient less than the first preset threshold in the second target region is determined to be the water body pixel type. If the proportion of the water body pixel types among the historical water body types of the pixel with the backscatter coefficient less than the first preset threshold is less than or equal to the second preset threshold, then the water body type of the pixel with the backscatter coefficient less than the first preset threshold in the second target region is determined to be the non-water body pixel type. In this embodiment, the surface water information of the second target region is determined by the SAR satellite, which improves the accuracy of monitoring the surface water information of the area to be monitored.

FIG. 6 is a flow chart showing the method for determining the water body type corresponding to a pixel in other regions according to an embodiment of the present application. This embodiment relates to a possible implementation of how to determine the water body type of the pixel in the other target regions in the optical satellite image. On the basis of the embodiments above, as shown in FIG. 6, the step S204 includes steps S601 to S604.

In step S601, historical water body types of pixels in third target regions in optical satellite images in the plurality of historical time periods are obtained. Each third target region is a snow-covered region and/or a mountain-covered region among the other regions.

A duration of one historical time period is the same as a duration of the preset time period. For example, if the preset time period is November 2022, then the one historical time period is one month. Taking the plurality of historical time periods including March to October 2022 as an example, eight historical time periods are included in total.

Because the snow-covered region and the mountain-covered region in the area to be monitored affect the monitoring of surface water in the area to be monitored, it is necessary to determine the third target region containing the snow-covered region and/or the mountain-covered region in the optical satellite image first.

The snow-covered region may be determined according to the following manners. Taking the images of the Landsat-8 satellite and the images of the Sentinel-2 satellite as the optical satellite images as an example for illustration, as for the snow-covered region, firstly, the reflectances of the top layer of the atmosphere corresponding to six wave bands of pixels in the Landsat-8 satellite images and the Sentinel-2 satellite images are obtained. The six wave bands are a blue wave band, a green wave band, a red wave band, a near-infrared wave band, a short-wave near-infrared wave band 1, and a short-wave near-infrared wave band 2. A normalized difference water index and a modified normalized difference water index of each pixel are determined according to the reflectance of the top layer of the atmosphere corresponding to each pixel. Formula (5) denotes a calculation of the normalized difference water index, and Formula (6) denotes a calculation of the modified normalized difference water index.

$$NDWI = \frac{GREEN - NIR}{GREEN + NIR} \tag{5}$$

$$MNDWI = \frac{GREEN - SWIR1}{GREEN + SWIR1} \tag{6}$$

where NDWI denotes the normalized difference water index, MNDWI denotes the modified normalized difference water index, GREEN denotes the reflectance of the top layer of the atmosphere of the green wave band, NIR denotes the reflectance of the top layer of the atmosphere of the near-infrared wave band, SWIR1 denotes the reflectance of the top layer of the atmosphere of the short-wave near-infrared wave band 1.

In the present embodiment, if only one frame of optical satellite image of the area to be monitored is obtained in the preset time period, the reflectance of the top layer of the atmosphere corresponding to the same wave band of the pixel in the frame of optical satellite image is directly obtained. If a plurality of frames of optical satellite images of the area to be monitored are obtained in the preset time period, a median of the reflectances of the top layer of the atmosphere corresponding to the same wave band of the pixels in all optical satellite images is taken as the reflectance of the top layer of the atmosphere corresponding to the same wave band of the pixel in the optical satellite image of the area to be monitored. For example, taking the green wave band as an example, if three optical satellite images X, Y and Z of the area to be monitored are obtained in the preset time period, the reflectance of the top layer of the atmosphere of the green wave band corresponding to a pixel i in the image X is 0.01, the reflectance of the top layer of the atmosphere of the green wave band corresponding to a pixel i in the image Y is 0.02, and the reflectance of the top layer of the atmosphere of the green wave band corresponding to a pixel i in the image Z is 0.03, then 0.02 is taken as the reflectance of the top layer of the atmosphere of the green wave band corresponding to the pixel i.

In some embodiments, if a plurality of frames of the optical satellite images of the area to be monitored are obtained in the preset time period, an average reflectance of the top layer of the atmosphere corresponding to the same wave band of the pixels in all optical satellite images is taken as the reflectance of the top layer of the atmosphere corresponding to the same wave band of the pixel in the optical satellite image of the area to be monitored, which is not limited thereto. After the normalized difference water index and the modified normalized difference water index are determined, a snow water extraction index (SWEI) corresponding to each pixel in the optical satellite image is determined according to a geometric linear discrimination analysis (GLDA) algorithm and the reflectance of the top layer of the atmosphere of each wave band corresponding to each pixel in the optical satellite image, the normalized difference water index, and the modified normalized difference water index. The calculation of the snow water extraction index is denoted as formula (7):

$$SWEI = \beta^T x \tag{7}$$

where: $\beta =$ $$[-0.051, -0.463, 0.654, -0.083, 0.382, -0.401, 0.155, -0.146]^T \text{ and}$$

$$x = [B, G, R, NIR, SWIR1, SWIR2, NDWI, MNDWI]^T$$

where β is a parameter trained and obtained by using the GLDA algorithm combining samples of optical satellite images of snow-covered area, B denotes the reflectance of the top layer of the atmosphere of the blue wave band, G denotes the reflectance of the top layer of the atmosphere of the green wave band, R denotes the reflectance of the top layer of the atmosphere of the red wave band, NDWI denotes the normalized difference water index, MNDWI denotes the modified normalized difference water index, NIR denotes the reflectance of the top layer of the atmosphere of the near-infrared wave band, SWIR1 denotes the reflectance of the top layer of the atmosphere of the short-wave near-infrared wave band 1, and SWIR2 denotes the reflectance of the top layer of the atmosphere of the short-wave near-infrared wave band 2.

After the snow water extraction index of each pixel in the optical satellite image is obtained, the region where the pixel, whose snow water extraction index is greater than a fourth preset threshold, is located is determined to be the snow-covered region.

For the mountain-covered region, firstly, a digital elevation model (DEM) closest to the preset time period is selected, then a slope value of the region where each pixel is located is calculated by using the DEM, and the region with the slope value greater than 3 degrees is determined to be the mountain-covered region. Finally, the snow-covered region and/or the mountain-covered region are determined to be the third target region, and the historical water body types of the pixel in the third target region in the optical satellite images in the plurality of historical time periods are obtained.

In step S602, a water body type of the pixel in each third target region is determined according to the historical water body types of the pixels in the third target regions in the plurality of historical time periods.

If the number of the water body pixel types among historical water body types of the pixel in the third target region is greater than a second preset number, then the water body type of the pixel with the number of the water body pixel types greater than the second preset number is determined as the water body pixel type. If the number of water body pixel types among the historical water body types corresponding to pixel in the third target region is less than or equal to the second preset number, then the water body type of the pixel with the number of the water body pixel types less than or equal to the second preset number is determined as the non-water body pixel type.

The present disclosure is described by combining with the above example. The second preset number is set to be six. If the pixel j is determined to be the water body pixel type for seven times and determined to be the non-water body pixel type once during March to October 2022, then the water body type of the pixel j is determined to be the water body pixel type. If the pixel j is determined to be the water body pixel type for four times and determined to be the non-water body pixel type for four times during March to October 2022, then the water body type of the pixel j is determined to be the non-water body pixel type, because the number of the water body pixel types among the historical water body types of the pixel j during March to October is less than the second preset number 6.

In step S603, a new water detection index (WDI) of a pixel in a fourth target region is determined according to the GLDA algorithm and reflectance of the top layer of the atmosphere of each wave band corresponding to the pixel in the fourth target region.

Exemplarily, the new WDI is calculated according to the following formula (8):

$$WDI = \beta^T x \qquad (8)$$

where:$\beta =$ $[-0.171, 0.674, -0.534, -0.252, -0.055, 0.358, -0.030, 0.207]^T$ and $x = [B, G, R, NIR, SWIR1, SWIR2, NDWI, MNDWI]^T$ where $\beta$ is a parameter trained and obtained by using the GLDA algorithm combining samples of the optical satellite images, B denotes the reflectance of the top layer of the atmosphere of the blue wave band, G denotes the reflectance of the top layer of the atmosphere of the green wave band, R denotes the reflectance of the top layer of the atmosphere of the red wave band, NDWI denotes the normalized difference water index, MNDWI denotes the modified normalized difference water index, NIR denotes the reflectance of the top layer of the atmosphere of the near-infrared wave band, SWIR1 denotes the reflectance of the top layer of the atmosphere of the short-wave near-infrared wave band 1, and SWIR2 denotes the reflectance of the top layer of the atmosphere of the short-wave near-infrared wave band 2.

In step S604, a water body type of the pixel in the fourth target region is determined according to the new WDI of the pixel in the fourth target region. The fourth target region is a region among the other regions other than the third target region.

Exemplarily, the water body type of the pixel in the fourth target region may be determined according to a product obtained by multiplying the new WDI of the pixel in the fourth target region by the first preset coefficient.

In the embodiment of the present application, the historical water body types each corresponding to the pixel in the third target region in each of the optical satellite images in the plurality of historical time periods are obtained, and the third target region is the snow-covered region and/or the mountain-covered region among the other regions. Then the water body type of the pixel in the third target region is determined according to the historical water body types each corresponding to the pixel in the third target region in each of the plurality of historical time periods. Further, the new WDI of the pixel in the fourth target region is determined according to the GLDA algorithm and the reflectance of the top layer of the atmosphere of each wave band corresponding to the pixel in the fourth target region. The water body type of the pixel in the fourth target region is determined according to the new WDI of the pixel in the fourth target region. The fourth target region is the region other than the third target region among the other regions. In the present embodiment, by determining the water body types corresponding to the pixels in the third target region and in the fourth target region, influences of the snow covering and the mountain covering on the monitoring of the surface water information of the area to be monitored are eliminated, thereby improving the accuracy of monitoring the surface water information of the area to be monitored.

FIG. 7 is a flow chart showing the method for determining the water body type of the pixel in the third target region according to an embodiment of the present application. The present embodiment relates to a possible implementation of how to determine the water body type of the pixel in the third target region according to the historical water body types of the pixel in the third target region in each of the plurality of historical time periods. On the basis of the above embodiments, as shown in FIG. 7, the step S602 includes steps S701 and S702.

In the step S701, if the proportion of the water body pixel types among the historical water body types of the pixel in the third target region is greater than the second preset threshold, the water body type of the pixel corresponding to the proportion greater than the second preset threshold is determined to be the water body pixel type.

In the step S702, if the proportion of the water body pixel types among the historical water body types of the pixel in the third target region is less than or equal to the second preset threshold, the water body type of the pixel corresponding to the proportion less than or equal to the second preset threshold is determined to be the non-water body pixel type.

The present disclosure is described by combining with the above example. The second preset threshold is set to 50%. If the pixel j is determined to be the water body pixel type for seven times, and determined to be the non-water body pixel type once during March to October 2022, the proportion of the water body pixel types among the historical water body types of the pixel is 87.5%, which is greater than the second preset threshold, namely 50%, then the water body type of the pixel j is determined to be the water body pixel type. If the pixel j is determined to be the water body pixel type for three times and determined to be the non-water body pixel type for five times during March to October 2022, the proportion of the water body pixel types corresponding to the pixel j during March to October is 37.5%, which is less than the second preset threshold, namely 50%, then the water body type of pixel j is determined to be the non-water body pixel type.

In the embodiment of the present application, if the proportion of the water body pixel types among the historical water body types of the pixel in the third target region is greater than the second preset threshold, then the water body type of the pixel corresponding to the proportion of the water body pixel types greater than the second preset threshold is determined to be the water body pixel type. If the proportion of water body pixel types among the historical water body types corresponding to pixel in the third target region is less than or equal to the second preset threshold, then the water body type of the pixel corresponding to the proportion of the water body pixel types less than or equal to the second preset threshold is determined to be the non-water body pixel type. In the present embodiment, by determining the water body type of the pixel in the third target region, the influences of the snow covering and the mountain covering on the monitoring of the surface water information of the area to be monitored are eliminated, thereby improving the accuracy of the monitoring of the surface water information of the area to be monitored.

FIG. 8 is a flow chart showing the method for determining the water body type of the pixel in the fourth target region according to an embodiment of the present application. The present embodiment relates to a possible implementation of how to determine the water body type of the pixel in the fourth target region according to the new WDI of the pixel in the fourth target region. On the basis of the above embodiments, as shown in FIG. 8, the step S604 includes steps S801 and S802.

In the step S801, if the new WDI of the pixel in the fourth target region is greater than a third preset threshold, the water body type of the pixel with the new WDI greater than the third preset threshold is determined to be the water body pixel type.

In the step S802, if the new WDI of the pixel in the fourth target region is less than or equal to the third preset threshold, the water body type of the pixel with the new WDI less than or equal to the third preset threshold is determined to be the non-water body pixel type.

The third preset threshold is obtained by a visual verification, and in the present embodiment, the third preset threshold is set to be 0.06. If the optical satellites are the same kind of satellites, the water body type of the pixel with the new WDI greater than the third preset threshold is determined to be the water body pixel type, and the water body type of the pixel with the new WDI less than or equal to the third preset threshold is determined to be the non-water body pixel type.

For the optical satellites including at least two kinds of satellites, if the water body type of the pixel in the fourth target region in the image of any kind of optical satellite is the water body pixel type, the water body type of the pixel in the fourth target region is determined to be the water body pixel type. If the water body type of the pixel in the fourth target region in each image of all kinds of optical satellites is the non-water body pixel type, the water body type of the pixel in the fourth target region is determined to be the non-water body pixel type. The Landsat-8 satellite images and the Sentinel-2 satellite images are used as the optical satellite images, if the water body type of the pixel i of the fourth target region in the Landsat-8 satellite image is the water body pixel type, and the water body type of the pixel i of the fourth target region in the Sentinel-2 satellite image is the non-water body pixel type, then the water body type of the pixel in the fourth target region is determine to be the water body pixel type. If the water body type of the pixel i in the fourth target region in the Landsat-8 satellite image is the non-water body pixel type, and the water body type of the pixel i in the fourth target region in the Sentinel-2 satellite image is the non-water body pixel type, then the water body type of the pixel in the fourth target region is determined to be the non-water body pixel type.

In the embodiment of the present application, the new WDI of the pixel in the fourth target region is determined according to the GLDA algorithm and the reflectance of the top layer of the atmosphere of each wave band corresponding to the pixel in the fourth target region Further, if the new WDI of the pixel in the fourth target region is greater than the third preset threshold, the water body type of the pixel with the new WDI greater than the third preset threshold is determined to be the water body pixel type, and if the new WDI of the pixel in the fourth target region is less than or equal to the third preset threshold, the water body type of the pixel with the new WDI less than or equal to the third preset threshold is determined to be the non-water body pixel type. The water body type of the pixel in the fourth target region is determined according to the new WDI of the pixel in the fourth target region, which improves the accuracy of the monitoring of the surface water information of the area to be monitored.

It should be understood that although the steps in the flow charts of the embodiments as described above are shown sequentially as indicated by the arrows, these steps are not necessarily performed sequentially in the order indicated by the arrows. Unless explicitly stated herein, these steps are performed in no strict order and they may be performed in any other order. Moreover, at least some of the steps in the flowcharts of the embodiments as described above may include a plurality of steps or stages that are not necessarily performed at the same moment, but may be performed at different moments, and the order in which these steps or stages are performed is not necessarily sequential, but may be performed alternately or alternately with other steps or with at least some of the steps or stages in other steps.

Based on the same inventive concept, an embodiment of the present application also provides a surface water monitoring apparatus for implementing the surface water monitoring method as described above. The solutions to address the problem provided by the apparatus are similar to the implementations of the method described above, so specific limitations in the one or more embodiments of the surface water monitoring apparatus provided below may be understood with reference to the limitations of the surface water monitoring method above and will not be repeated hereinafter.

In an embodiment, as shown in FIG. 9, a surface water monitoring apparatus is provided, and includes an acquisition module 901, a first determination module 902, a second determination module 903, a third determination module 904, and a fourth determination module 905.

The acquisition module 901 is configured to obtain optical satellite images and SAR satellite images of an area to be monitored in a preset time period.

The first determination module 902 is configured to determine a first target region in each of the optical satellite images. The first target region is a region in the optical satellite image, where pixels, whose observation data volume is less than or equal to a preset data volume, is located.

The second determination module 903 is configured to determine a water body type of a pixel in a second target region in the SAR satellite image corresponding to the first target region.

The third determination module 904 is configured to determine water body types of pixels in other regions in the optical satellite image. The other regions are regions in the optical satellite image other than the first target region.

The fourth determination module 905 is configured to determine surface water distribution information of the area to be monitored in the preset time period according to the water body type of the pixel in the second target region and the water body types of the pixels in the other regions.

In an embodiment, the second determination module 903 includes a first determination unit and a second determination unit.

The first determination unit is configured to determine a backscatter coefficient corresponding to the pixel in the second target region.

The second determination unit is configured to determine the water body type of the pixel in the second target region according to the backscatter coefficient corresponding to the pixel in the second target region.

In an embodiment, the second determination unit is specifically configured to determine the water body type of the pixel with the backscatter coefficient greater than or equal to a first preset threshold to be the non-water body pixel type if the backscatter coefficient corresponding to the pixel in the second target region is greater than or equal to the first preset threshold.

In an embodiment, the second determination unit is specifically configured to obtain historical water body types of the pixel with the backscatter coefficient less than the first preset threshold in a plurality of historical time periods if the backscatter coefficient corresponding to the pixel in the second target region is less than the first preset threshold, and determine the water body type of the pixel in the second target region with the backscatter coefficient less than the first preset threshold according to the historical water body types of the pixel with the backscatter coefficient less than the first preset threshold in the plurality of historical time periods.

In an embodiment, the second determination unit is specifically configured to determine the water body type of the pixel with the backscatter coefficient less than the first preset threshold in the second target region to be a water body pixel type if a proportion of the water body pixel types among the historical water body types of the pixel with the backscatter coefficient less than the first preset threshold is greater than a second preset threshold, and determine the water body type of the pixel with the backscatter coefficient less than the first preset threshold in the second target region to be the non-water body pixel type if the proportion of the water body pixel types among the historical water body types of the pixel with the backscatter coefficient less than the first preset threshold is less than or equal to the second preset threshold.

In an embodiment, the third determination module 904 includes an acquisition unit, a third determination unit, a fourth determination unit and a fifth determination unit.

The acquisition unit is configured to obtain historical water body types of pixels in third target regions in the optical satellite images in a plurality of historical time periods. Each third target region is a snow-covered region and/or a mountain-covered region among the other regions.

The third determination unit is configured to determine a water body type of the pixel in the third target region according to the historical water body types of the pixels in the third target regions in the plurality of historical time periods.

The fourth determination unit is configured to determine a new WDI of a pixel in a fourth target region according to the GLDA algorithm and reflectance of the top layer of the atmosphere of each wave band corresponding to the pixel in the fourth target region.

The fifth determination unit is configured to determine a water body type of the pixel in the fourth target region according to the new WDI of the pixel in the fourth target region. The fourth target region is a region among the other regions other than the third target region.

In one of the embodiments, the third determination unit is specifically configured to determine the water body type of the pixel corresponding to the proportion greater than a second preset threshold to be a water body pixel type if the proportion of the water body pixel types in the historical water body types of the pixel in the third target region is greater than the second preset threshold, and determine the water body type of the pixel corresponding to the proportion less than or equal to the second preset threshold to be the non-water body pixel type if the proportion of the water body pixel types among the historical water body types of the pixel in the third target region is less than or equal to the second preset threshold.

The fifth determination unit is specifically configured to determine the water body type of the pixel with the new WDI greater than the third preset threshold to be a water body pixel type if the new WDI of the pixel in the fourth target region is greater than the third preset threshold, and determine the water body type of the pixel with the new WDI less than or equal to the third preset threshold to be the non-water body pixel type if the new WDI of the pixel in the fourth target region is less than or equal to the third preset threshold.

The modules in the above surface water monitoring apparatus may be implemented in whole or in part by software, hardware and a combination thereof. Each of the above modules may be embedded in or independent of a processor in a computer device in a hardware form, or may be stored on a memory in the computer device in a software form, so that the processor may call and perform the operations corresponding to each of the modules above.

In an embodiment, a computer device is provided, and includes a processor, and a memory storing computer programs. The processor, when executing the computer programs, implements following steps.

Optical satellite images and synthetic aperture radar (SAR) satellite images of an area to be monitored in a preset time period are obtained.

A first target region in each of the optical satellite images is determined. The first target region is a region in the optical satellite image, where pixels, whose observation data volume is less than or equal to a preset data volume, is located.

A water body type of a pixel in a second target region in the SAR satellite image corresponding to the first target region is determined.

Water body types of pixels in other regions in the optical satellite image are determined. The other regions are regions in the optical satellite image other than the first target region.

Surface water distribution information of the area to be monitored in the preset time period is determined according to the water body type of the pixel in the second target region and the water body types of the pixels in the other regions.

In an embodiment, the processor, when executing the computer programs, further implements following steps.

A backscatter coefficient corresponding to the pixel in the second target region is determined.

The water body type of the pixel in the second target region is determined according to the backscatter coefficient corresponding to the pixel in the second target region.

In an embodiment, the processor, when executing the computer programs, further implements following steps.

If the backscatter coefficient corresponding to the pixel in the second target region is greater than or equal to a first preset threshold, the water body type of the pixel with the backscatter coefficient greater than or equal to the first preset threshold is determined to be a non-water body pixel type.

In an embodiment, the processor, when executing the computer programs, further implements the following steps.

If the backscatter coefficient corresponding to the pixel in the second target region is less than the first preset threshold, historical water body types of the pixel with the backscatter coefficient less than the first preset threshold in a plurality of historical time periods are obtained.

The water body type of the pixel in the second target region with the backscatter coefficient less than the first preset threshold is determined according to the historical water body types of the pixel with the backscatter coefficient less than the first preset threshold in the plurality of historical time periods.

In an embodiment, the processor, when executing the computer programs, further implements the following steps.

If a proportion of the water body pixel types among the historical water body types of the pixel with the backscatter coefficient less than the first preset threshold is greater than a second preset threshold, the water body type of the pixel with the backscatter coefficient less than the first preset threshold in the second target region is determined to be the water body pixel type.

If the proportion of the water body pixel types among the historical water body types of the pixel with the backscatter coefficient less than the first preset threshold is less than or equal to the second preset threshold, the water body type of the pixel with the backscatter coefficient less than the first preset threshold in the second target region is determined to be the non-water body pixel type.

In an embodiment, the processor, when executing the computer programs, further implements the following steps.

Historical water body types of pixels in third target regions in the optical satellite images in the plurality of historical time periods are obtained. Each third target region is a snow-covered region and/or a mountain-covered region among the other regions.

A water body type of the pixel in the third target region is determined according to the historical water body types of the pixels in the third target regions in the plurality of historical time periods.

A new WDI of a pixel in a fourth target region is determined according to the GLDA algorithm and reflectance of the top layer of atmosphere of each wave band corresponding to the pixel in the fourth target region.

A water body type of the pixel in the fourth target region is determined according to the new WDI of the pixel in the fourth target region. The fourth target region is a region among the other regions other than the third target region.

In an embodiment, the processor, when executing the computer programs, further implements the following steps.

If the proportion of the water body pixel types among the historical water body types of the pixel in the third target region is greater than the second preset threshold, the water body type of the pixel corresponding to the proportion greater than the second preset threshold is determined to be the water body pixel type.

If the proportion of the water body pixel types among the historical water body types of the pixel in the third target region is less than or equal to the second preset threshold, the water body type of the pixel corresponding to the proportion less than or equal to the second preset threshold is determined to be the non-water body pixel type.

In an embodiment, the processor, when executing the computer programs, further implements the following steps.

If the new WDI of the pixel in the fourth target region is greater than a third preset threshold, the water body type of the pixel with the new WDI greater than the third preset threshold is determined as a water body pixel type.

If the new WDI of the pixel in the fourth target region is less than or equal to the third preset threshold, the water body type of the pixel with the new WDI less than or equal to the third preset threshold is determined to be a non-water body pixel type.

In an embodiment, a non-transitory computer-readable storage medium is provided, and has computer programs stored thereon. The computer programs, when executed by the processor, implement following steps.

Optical satellite images and synthetic aperture radar (SAR) satellite images of an area to be monitored in a preset time period are obtained.

A first target region in each of the optical satellite images is determined. The first target region is a region in the optical satellite image, where pixels, whose observation data volume is less than or equal to a preset data volume, is located.

A water body type of a pixel in a second target region in the SAR satellite image corresponding to the first target region is determined.

Water body types of pixels in other regions in the optical satellite image are determined. The other regions are regions in the optical satellite image other than the first target region.

Surface water distribution information of the area to be monitored in the preset time period is determined according to the water body type of the pixel in the second target region and the water body types of the pixels in the other regions.

In an embodiment, the computer programs, when executed by the processor, further implement following steps.

A backscatter coefficient corresponding to the pixel in the second target region is determined.

The water body type of the pixel in the second target region is determined according to the backscatter coefficient corresponding to the pixel in the second target region.

In an embodiment, the computer programs, when executed by the processor, further implement following steps.

If the backscatter coefficient corresponding to the pixel in the second target region is greater than or equal to a first preset threshold, the water body type of the pixel with the backscatter coefficient greater than or equal to the first preset threshold is determined to be a non-water body pixel type.

In an embodiment, the computer programs, when executed by the processor, further implement following steps.

If the backscatter coefficient corresponding to the pixel in the second target region is less than the first preset threshold, historical water body types of the pixel with the backscatter coefficient less than the first preset threshold in a plurality of historical time periods are obtained.

The water body type of the pixel in the second target region with the backscatter coefficient less than the first preset threshold is determined according to the historical water body types of the pixel with the backscatter coefficient less than the first preset threshold in the plurality of historical time periods.

In an embodiment, the computer programs, when executed by the processor, further implement following steps.

If a proportion of the water body pixel types among the historical water body types of the pixel with the backscatter coefficient less than the first preset threshold is greater than a second preset threshold, the water body type of the pixel with the backscatter coefficient less than the first preset threshold in the second target region is determined to be the water body pixel type.

If the proportion of the water body pixel types among the historical water body types of the pixel with the backscatter coefficient less than the first preset threshold is less than or equal to the second preset threshold, the water body type of the pixel with the backscatter coefficient less than the first preset threshold in the second target region is determined to be the non-water body pixel type.

In an embodiment, the computer programs, when executed by the processor, further implement following steps.

Historical water body types of pixels in third target regions in the optical satellite images in the plurality of historical time periods are obtained. Each third target region is a snow-covered region and/or a mountain-covered region among the other regions.

A water body type of the pixel in the third target region is determined according to the historical water body types of the pixels in the third target regions in the plurality of historical time periods.

A new WDI of a pixel in a fourth target region is determined according to the GLDA algorithm and reflectance of a top layer of atmosphere of each wave band corresponding to the pixel in the fourth target region.

A water body type of the pixel in the fourth target region is determined according to the new WDI of the pixel in the fourth target region. The fourth target region is a region among the other regions other than the third target region.

In an embodiment, the computer programs, when executed by the processor, further implement following steps.

If the proportion of the water body pixel types among the historical water body types of the pixel in the third target region is greater than the second preset threshold, the water body type of the pixel corresponding to the proportion greater than the second preset threshold is determined to be the water body pixel type.

If the proportion of the water body pixel types among the historical water body types of the pixel in the third target region is less than or equal to the second preset threshold, the water body type of the pixel corresponding to the proportion less than or equal to the second preset threshold is determined to be the non-water body pixel type.

In an embodiment, the computer programs, when executed by the processor, further implement following steps.

If the new WDI of the pixel in the fourth target region is greater than a third preset threshold, the water body type of the pixel with the new WDI greater than the third preset threshold is determined as a water body pixel type.

If the new WDI of the pixel in the fourth target region is less than or equal to the third preset threshold, the water body type of the pixel with the new WDI less than or equal to the third preset threshold is determined to be a non-water body pixel type.

In an embodiment, a computer program product is provided, and includes computer programs. The computer programs, when executed by a processor, implement following steps.

Optical satellite images and synthetic aperture radar (SAR) satellite images of an area to be monitored in a preset time period are obtained.

A first target region in each of the optical satellite images is determined. The first target region is a region in the optical satellite image, where pixels, whose observation data volume is less than or equal to a preset data volume, is located.

A water body type of a pixel in a second target region in the SAR satellite image corresponding to the first target region is determined.

Water body types of pixels in other regions in the optical satellite image are determined. The other regions are regions in the optical satellite image other than the first target region.

Surface water distribution information of the area to be monitored in the preset time period is determined according to the water body type of the pixel in the second target region and the water body types of the pixels in the other regions.

In an embodiment, the computer programs, when executed by the processor, further implement following steps.

A backscatter coefficient corresponding to the pixel in the second target region is determined.

The water body type of the pixel in the second target region is determined according to the backscatter coefficient corresponding to the pixel in the second target region.

In an embodiment, the computer programs, when executed by the processor, further implement following steps.

If the backscatter coefficient corresponding to the pixel in the second target region is greater than or equal to a first preset threshold, the water body type of the pixel with the backscatter coefficient greater than or equal to the first preset threshold is determined to be a non-water body pixel type.

In an embodiment, the computer programs, when executed by the processor, further implement following steps.

If the backscatter coefficient corresponding to the pixel in the second target region is less than the first preset threshold, historical water body types of the pixel with the backscatter coefficient less than the first preset threshold in a plurality of historical time periods are obtained.

The water body type of the pixel in the second target region with the backscatter coefficient less than the first preset threshold is determined according to the historical water body types of the pixel with the backscatter coefficient less than the first preset threshold in the plurality of historical time periods.

In an embodiment, the computer programs, when executed by the processor, further implement following steps.

If a proportion of the water body pixel types among the historical water body types of the pixel with the backscatter coefficient less than the first preset threshold is greater than a second preset threshold, the water body type of the pixel with the backscatter coefficient less than the first preset threshold in the second target region is determined to be the water body pixel type.

If the proportion of the water body pixel types among the historical water body types of the pixel with the backscatter coefficient less than the first preset threshold is less than or equal to the second preset threshold, the water body type of the pixel with the backscatter coefficient less than the first preset threshold in the second target region is determined to be the non-water body pixel type.

In an embodiment, the computer programs, when executed by the processor, further implement following steps.

Historical water body types of pixels in third target regions in the optical satellite images in the plurality of historical time periods are obtained. Each third target region is a snow-covered region and/or a mountain-covered region among the other regions.

A water body type of the pixel in the third target region is determined according to the historical water body types of the pixels in the third target regions in the plurality of historical time periods.

A new WDI of a pixel in a fourth target region is determined according to the GLDA algorithm and reflectance of a top layer of atmosphere of each wave band corresponding to the pixel in the fourth target region.

A water body type of the pixel in the fourth target region is determined according to the new WDI of the pixel in the fourth target region. The fourth target region is a region among the other regions other than the third target region.

In an embodiment, the computer programs, when executed by the processor, further implement following steps.

If the proportion of the water body pixel types among the historical water body types of the pixel in the third target region is greater than the second preset threshold, the water body type of the pixel corresponding to the proportion greater than the second preset threshold is determined to be the water body pixel type.

If the proportion of the water body pixel types among the historical water body types of the pixel in the third target region is less than or equal to the second preset threshold, the water body type of the pixel corresponding to the proportion less than or equal to the second preset threshold is determined to be the non-water body pixel type.

In an embodiment, the computer programs, when executed by the processor, further implement following steps.

If the new WDI of the pixel in the fourth target region is greater than a third preset threshold, the water body type of the pixel with the new WDI greater than the third preset threshold is determined as a water body pixel type.

If the new WDI of the pixel in the fourth target region is less than or equal to the third preset threshold, the water body type of the pixel with the new WDI less than or equal to the third preset threshold is determined to be a non-water body pixel type.

It should be noted that the user information (including but not limited to user device information, user personal information, etc.) and data (including but not limited to data used for analysis, stored data, displayed data, etc.) involved in the present application are information and data authorized by the user or fully authorized by all parties.

A person of ordinary skill in the art may understand that implementation of all or part of the processes in the methods of the above embodiments may be completed by instructing the relevant hardware through a computer program. The computer program may be stored in a non-transitory computer-readable storage medium. When the computer program is executed, it may include the processes in the embodiments of the above methods. Any reference to memory, database or other medium used in the embodiments provided in the present application may include at least one of a non-volatile and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), or a graphene memory, etc. The volatile memory may include a random access memory (RAM) or an external cache memory, etc. As an illustration rather than a limitation, the random access memory may be in various forms, such as a static random access memory (SRAM) or a dynamic random access memory (DRAM), etc. The databases involved in the embodiments provided by the present application may include at least one of a relational database and a non-relational database. The non-relational database may include, but is not limited to, a blockchain-based distributed database, etc. The processor involved in the embodiments provided by the present application may be, but is not limited to, a general purpose processor, a central processor, a graphics processor, a digital signal processor, a programmable logic device, a data processing logic device based on quantum computation, and the like.

The technical features in the above embodiments may be combined arbitrarily. For concise description, not all possible combinations of the technical features in the above embodiments are described. However, provided that they do not conflict with each other, all combinations of the technical features are to be considered to be within the scope described in this specification.

The above-mentioned embodiments only describe several implementations of the present application, and their description is specific and detailed, but should not be understood as a limitation on the patent scope of the present application. It should be noted that, for those skilled in the art variations and improvements may be further made without departing from the conception of the present application, and these variations and improvements all fall within the protection scope of the present application. Therefore, the protection scope of the present application should be subject to the appended claims.

What is claimed is:

1. A surface water monitoring apparatus, comprising:
   an acquisition module configured to obtain optical satellite images and SAR satellite images of an area to be monitored in a preset time period;
   a first determination module configured to determine a first target region in each optical satellite image, the first target region being a region in the optical satellite image, where pixels, whose observation data volume is less than or equal to a preset data volume, is located;
   a second determination module configured to determine a water body type of a pixel in a second target region in the SAR satellite image corresponding to the first target region as being either a water body type or non-water body type;
   a third determination module configured to determine water body types of pixels in other regions in the optical satellite image, the other regions being regions in the optical satellite image other than the first target region; and
   a fourth determination module configured to determine surface water distribution information of the area to be monitored in the preset time period according to the water body type of the pixel in the second target region and the water body types of the pixels in the other regions.

2. The surface water monitoring apparatus of claim 1, wherein the second determination module comprises:

a first determination unit configured to obtain a backscatter coefficient corresponding to the pixel in the second target region; and a second determination unit configured to determine the water body type of the pixel in the second target region according to the backscatter coefficient corresponding to the pixel in the second target region.

3. The surface water monitoring apparatus of claim 2, wherein the second determination unit is further configured to determine the water body type of the pixel with the backscatter coefficient greater than or equal to a first preset threshold to be a non-water body pixel type if the backscatter coefficient corresponding to the pixel in the second target region is greater than or equal to the first preset threshold.

4. The surface water monitoring apparatus of claim 3, wherein the second determination unit is further configured to:

obtain historical water body types of the pixel with the backscatter coefficient less than the first preset threshold in a plurality of historical time periods if the backscatter coefficient corresponding to the pixel in the second target region is less than the first preset threshold; and determine the water body type of the pixel in the second target region with the backscatter coefficient less than the first preset threshold according to the historical water body types of the pixel with the backscatter coefficient less than the first preset threshold in the plurality of historical time periods.

5. The surface water monitoring apparatus of claim 4, wherein the second determination unit is further configured to:

determine the water body type of the pixel with the backscatter coefficient less than the first preset threshold in the second target region to be a water body pixel type if a proportion of the water body pixel types among the historical water body types of the pixel with the backscatter coefficient less than the first preset threshold is greater than a second preset threshold; and determine the water body type of the pixel with the backscatter coefficient less than the first preset threshold in the second target region to be the non-water body pixel type if the proportion of the water body pixel types among the historical water body types of the pixel with the backscatter coefficient less than the first preset threshold is less than or equal to the second preset threshold.

6. The surface water monitoring apparatus of claim 1, wherein the third determination module comprises:

an acquisition unit configured to obtain historical water body types of pixels in third target regions in optical satellite images in a plurality of historical time periods, wherein each third target region is at least one of a snow-covered region and a mountain-covered region among the other regions;

a third determination unit configured to determine a water body type of the pixel in each third target region according to the historical water body types of the pixels in the third target regions in the plurality of historical time periods;

a fourth determination unit configured to determine a new water detection index (WDI) of a pixel in a fourth target region according to a geometric linear discrimination analysis (GLDA) algorithm and reflectance of a top layer of atmosphere of each wave band corresponding to the pixel in the fourth target region; and a fifth determination unit configured to determine a water body type of the pixel in the fourth target region according to the new WDI of the pixel in the fourth target region, the fourth target region being a region other than the third target region among the other regions.

7. The surface water monitoring apparatus of claim 6, wherein the third determination unit is configured to:

determine the water body type of the pixel corresponding to a proportion of water body pixel types among the historical water body types of the pixel in the third target region greater than the second preset threshold to be a water body pixel type, if the proportion is greater than the second preset threshold; and determine the water body type of the pixel corresponding to the proportion less than or equal to the second preset threshold to be a non-water body pixel type if the proportion of the water body pixel type in the historical water body types of the pixel in the third target region is less than or equal to the second preset threshold.

8. The surface water monitoring apparatus of claim 6, wherein the fifth determination unit is further configured to:

determine the water body type of the pixel with the new WDI greater than a third preset threshold to be a water body pixel type, if the new WDI of the pixel in the fourth target region is greater than the third preset threshold; and determine the water body type of the pixel with the new WDI less than or equal to the third preset threshold as a non-water body pixel type, if the new WDI of the pixel in the fourth target region is less than or equal to the third preset threshold.

9. The surface water monitoring apparatus of claim 8, wherein optical satellites are the same kind of satellites, the water body type of the pixel with the new WDI greater than the third preset threshold is determined to be the water body pixel type, and the water body type of the pixel with the new WDI less than or equal to the third preset threshold is determined to be the non-water body pixel type.

10. The surface water monitoring apparatus of claim 8, wherein optical satellites comprise at least two kinds of satellites, the water body type of the pixel in the fourth target region is determined to be the water body pixel type if the water body type of the pixel in the fourth target region in an image of any one kind of optical satellite image is the water body pixel type, and the water body type of the pixel in the fourth target region is determined to be the non-water body pixel type, if the water body types of the pixels in the fourth target regions in all optical satellite images are the non-water body pixel types.

11. The surface water monitoring apparatus of claim 8, wherein the third preset threshold is set to be 0.06.

12. The surface water monitoring apparatus of claim 6, wherein the new WDI is calculated by:

$$WDI = \beta^T x$$

wherein $$\beta = [-0.171, 0.674, -0.534, -0.252, -0.055, 0.358, -0.030, 0.207]^T \text{ and}$$

$$x = [B, G, R, NIR, SWIR1, SWIR2, NDWI, MNDWI]^T$$

wherein B denotes the reflectance of the top layer of the atmosphere corresponding to a blue wave band, G denotes a reflectance of the top layer of the atmosphere corresponding to a green wave band, R denotes a reflectance of the top layer of the atmosphere corresponding to a red wave band, NDWI denotes a normalized difference water index, MNDWI denotes a modified normalized difference water index, NIR denotes a reflectance of the top layer of the atmosphere of a near-infrared wave band, SWIR1 denotes a reflectance of the top layer of the atmosphere of a short-wave near-infrared wave band 1, and SWIR2 denotes a reflectance of the top layer of the atmosphere of a short-wave near-infrared wave band 2.

13. The surface water monitoring apparatus of claim 3, wherein the first preset threshold is determined according to an expectation maximization algorithm and the backscatter coefficient corresponding to the pixel in the second target region.

14. The surface water monitoring apparatus of claim 4, wherein the historical water body types of the pixel with the backscatter coefficient less than the first preset threshold in the plurality of historical time periods are calculated according to observation data corresponding to each pixel in the optical satellite images in the plurality of historical time periods.

15. The surface water monitoring apparatus of claim 6, wherein a duration of one historical time period is the same as a duration of the preset time period.

* * * * *